US008286540B2

(12) United States Patent
Kachtan

(10) Patent No.: US 8,286,540 B2
(45) Date of Patent: Oct. 16, 2012

(54) EXTERNALLY MOUNTED WINDOW SYSTEM, A BRACKET THEREFORE AND A METHOD FOR ITS ASSEMBLY

(75) Inventor: Yoash Kachtan, Kibbutz Dafna (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 156 days.

(21) Appl. No.: 12/784,112

(22) Filed: May 20, 2010

(65) Prior Publication Data

US 2010/0294121 A1 Nov. 25, 2010

(30) Foreign Application Priority Data

May 21, 2009 (IL) .......................................... 198882

(51) Int. Cl.
*F41H 5/013* (2006.01)
*B23P 11/00* (2006.01)

(52) U.S. Cl. ............. 89/36.01; 89/920; 89/929; 89/930; 89/936; 89/937; 29/428; 29/525.11

(58) Field of Classification Search ................. 89/36.01, 89/36.02, 36.04, 36.07, 36.08, 36.09, 36.13, 89/36.14, 36.15; 52/208, 716.5, 786.12, 52/787.12; 280/770; 296/164.15, 201, 146.15; 29/428, 525.11
See application file for complete search history.

(56) References Cited

U.S. PATENT DOCUMENTS 3,855,898 A * 12/1974 McDonald .................. 89/36.08
4,114,331 A 9/1978 Yamamoto
4,132,446 A * 1/1979 Bauer .......................... 296/155
4,723,809 A * 2/1988 Kida et al. ................. 296/96.21
4,793,108 A * 12/1988 Bain et al. ...................... 52/208
5,083,501 A 1/1992 Yuill et al.
5,522,636 A * 6/1996 Kolar, Jr. .................. 296/146.15
5,529,366 A * 6/1996 Gold .......................... 296/96.21
6,263,627 B1 * 7/2001 Schonenbach et al. ......... 52/208
6,869,128 B2 3/2005 Farrar et al.
6,973,754 B2 * 12/2005 Iguchi et al. ..................... 52/208
7,232,181 B2 * 6/2007 Schmucker ................... 296/201
7,942,092 B1 * 5/2011 Kiel et al. .................... 89/36.13
2005/0172792 A1 8/2005 Wolf et al.
2008/0092730 A1 * 4/2008 Hall ............................ 89/36.04
2009/0120274 A1 * 5/2009 Schneider et al. ........... 89/36.08

FOREIGN PATENT DOCUMENTS

DE 41 42 416 A1 6/1993
DE 10 2005 011 096 B4 7/2008
EP 0 522 888 A1 1/1993
GB 1 224 415 3/1971
KR 10-2004-0021164 A 3/2004
WO 2007/059159 A2 5/2007

* cited by examiner

*Primary Examiner* — Bret Hayes

(74) *Attorney, Agent, or Firm* — Workman Nydegger

(57) ABSTRACT

An externally mounted window system, a bracket therefore and a method for its assembly is disclosed. The system includes a reinforced window pane fixed in a frame. The frame has at least two brackets, each having an L-shaped section. A first arm of the L-shaped section is armored against an incoming projectile and a second arm is fitted with at least one stud projecting through and secured within an opening formed in an external wall surface.

20 Claims, 7 Drawing Sheets

EXTERNALLY MOUNTED WINDOW SYSTEM, A BRACKET THEREFORE AND A METHOD FOR ITS ASSEMBLY

FIELD OF THE INVENTION

This invention relates to an externally mounted window for applying over an opening of an enclosure. The invention is further concerned with a mounting bracket for fixing the window and a method for assembly of the window over the opening utilizing such a bracket.

Hereinafter in the specification and claims, the term 'window' is used in its broad sense, to denote any type of window or door externally mounted over an opening formed at a wall of an enclosure.

The term 'enclosure' as used herein the specification and claims denotes, for example, any sort of land vehicles such as private cars, trucks, combat vehicles (e.g. personnel carriers, armored fighting vehicles and the like), helicopters, above-ground portions of buildings and structures, container tanks, etc.

BACKGROUND OF THE INVENTION

Often there is a need for providing a window in a wall of a protected enclosure, wherein said window is a high-resistant glass or composite material for securing passengers or equipment within the enclosure. One typical such example is an armored vehicle and the like wherein openings are formed in the generally armored enclosure and are covered with bullet-proof/blast-proof windows.

Several prior art publications address the issue of external mounting of a window. For example, KR2004021164A is directed to a bulletproof window for a vehicle includes a frame externally surrounded to the end of a bulletproof glass; a bonding agent spread on the inside of a frame coming in contact with the side of the bulletproof glass; and a buffering material interposed between the end of the bulletproof glass and the frame, to execute a buffering function between the frame and the bulletproof glass if the bulletproof glass receives impact. Combining structure of the bulletproof window comprises a guide rail having a section to be fixed to the inner cover-upper end of a door of the vehicle by an assembling screw; the bulletproof window with the bulletproof glass externally surrounded to the frame, to be inserted in the guide rail and be slid; and a fixing clip having at least one section to be fixed to a fitting projection disposed to the inside of the upper frame of the door. The fixing clip keeps the bulletproof window standing up on the guide rail.

DE102005011096A is directed to a composite safety window of the type comprising several glass and/or plastic layers bonded by transparent films or resin and having a plastic concluding layer directed to the interior and also a facially-surrounding frame as well as a jointing compound between the face and the frame is such that: (i) the face of a composite is covered in moisture-impermeable manner with a film and/or cover layer; and (ii) a barrier layer is arranged over both the circumferential edge zone of layer and the adjacent zone of the uncovered or masked facial side.

US Patent Application Publication 2005172792A discloses a composite armor plating, especially for installation in motor vehicles, is provided, and comprises individual plates having an outer layer, of a protective material of great hardness, and an inner layer of a fiber material of lesser hardness. Respective steel edge reinforcements of predetermined thickness that each extend along at least one outer edge of each of the plates are provided. Each edge reinforcement covers at least a side edge of the outer layer, and is fixedly connected with such plate.

However, several considerations are of importance in connection with protective windows of the aforementioned type. For example, the mounting bracket should have minimal interference with the viewing area of the window. Then, it is required that the window mounting bracket be least exposed to externally upcoming threats (shrapnel, bullets, etc.). Furthermore, it is required that neighboring windows be mounted adjoiningly with a minimum gap therebetween, and yet, the mounting bracket is required to be durable against upcoming threats as well as light-weight and easily assembled and disassembled.

SUMMARY OF THE INVENTION

The present invention calls for an externally mounted window fitted over an opening of an enclosure using a mounting bracket for fixing the window.

According to a first aspect of the invention there is provided a window system for externally mounting over an opening formed in a wall of an enclosure, the system comprising a reinforced window pane fixedly received within a frame comprising at least two brackets for securely mounting to an external wall surface delimiting said opening; wherein each bracket has an L-shape section with a first arm thereof securely attached to a side edge of the window pane such that a second arm extends substantially parallel and behind the window pane, and wherein said second arm is fixedly fitted with at least one stud projecting through and secured within an opening formed in the wall delimiting said opening.

According to another aspect of the invention there is provided a window frame for externally mounting a reinforced window pane over an opening formed in a wall of an enclosure, said frame comprising at least two brackets for securely mounting to an external wall surface delimiting said opening; wherein each bracket has an L-shape section with a first arm thereof securely attached to a side edge of the window pane such that a second arm extends substantially parallel and behind the window pane, and wherein said second arm is fixedly fitted with at least one stud projecting through and secured within an opening formed in the wall delimiting said opening.

According to yet an aspect of the invention there is provided a bracket of a frame for external mounting of a reinforced window pane over an opening formed in a wall of an enclosure, said frame comprising at least two brackets for securely mounting to an external wall surface delimiting said opening; wherein each bracket has an L-shape section with a first arm thereof securely attached to a side edge of the window pane such that a second arm extends substantially parallel and behind the window pane, and wherein said second arm is fixedly fitted with at least one stud projecting through and secured within an opening formed in the wall delimiting said opening.

The present invention is further concerned with a method for externally mounting a window over an opening in a wall of an enclosure, the method comprising the following steps:

(a) forming said opening at the enclosure;
(b) forming several through going bores at an external wall surface delimiting said opening;
(c) obtaining a frame comprising at least two brackets, each bracket having an L-shape section with a first arm and a second arm, said second arm is fixedly fitted with one or more studs projecting from a rear face of the second arm and corresponding with the location of said bores;

(d) fixedly fitting a reinforced window pane within the frame such that side edges of the window pane are securely attached to the first arm of the bracket and wherein the first arm extends substantially parallel and behind the window pane;

(e) mounting the assembled frame obtained at step (d) over said opening and fixing it by securing the studs at an inside surface of the wall;

Any one or more of the following features and designs may be incorporated in any of the aspects of the present invention:

the reinforced window pane is a multi-layered pane.

the thickness of the window pane is at least 40 mm.

the window pane is a ballistic window, i.e. it is by itself of such characteristics allowing it to withstand the impact of an incoming projectile.

a sealant material extends between the second arm of the bracket and the exterior delimiting surface of the opening in the wall.

the stud is screw threaded for fastening by a bolt.

the stud is a pin adapted for mounting thereon, from the inside of the vehicle, a pressure fitted member, e.g. a fastener, a cap etc.

an outside surface of the window is smooth, i.e. free of any obstacles or any projections beyond the external surface of the window pane. Accordingly, the first arm of the frame is flush with or shorter than the window thickness;

at least the first arm of the L-shaped bracket is made of high-hardness steel.

the second arm of the L-shaped bracket is made of mild steel.

a soft spacer is applied at an inner corner of the L-shaped bracket with a corner of the window pane bearing against said spacer, wherein according to a particular design said spacer has a rectangular cross-section.

the window pane is securely attached to the first arm of the L-shaped bracket by adhering.

an adhesive material is applied between the second arm of the L-shaped bracket and a rear surface of the window pane.

the window is substantially rectangular.

the frame comprises two opposite, substantially parallel L-shaped brackets.

the window is substantially triangular.

the enclosure may be fitted with two or more adjoining windows, wherein the first arms of neighboring L-shaped brackets extend in a back-to-back relation, giving rise to a T-like composed bracket.

where two or more adjoining windows are provided, two neighboring window panes share a common bracket having a T-like section.

the stud is welded to the second arm of the L-shaped bracket.

one of the stud and the second arm of the L-shaped bracket is fitted with one or more projections and the other of said stud and the is formed with corresponding one or more notches whereby the stud is rotatably secured to the second arm of the l-shaped bracket.

It should be noted that the design of the window system is such that, when the window system is mounted onto the wall of the enclosure, it protrudes from the enclosure, i.e. an external face of the window pane is not flush with an external surface of the wall of the enclosure. In other words, the first arm of the L-shaped bracket protrudes generally perpendicularly to the wall of the enclosure.

Nonetheless, it should be understood that the design of the window system is such that the studs holding the frame secured to the wall of the enclosure are protected from both front and side directions. In particular, for a projectile incoming in a direction generally perpendicular to the wall of the enclosure (e.g. in case of a direct hit), the stud is protected by the reinforced/ballistic window pane, and for a projectile incoming in a direction generally angled to the wall of the enclosure (e.g. in case of a side hit), the stud is protected by the high hardness steel of the first arm of the L-shaped bracket. In particular, the term ‘side hit’ should understood as also encompassing a ‘0’ angle, i.e. even a projectile incoming in a direction generally parallel to the wall of the enclosure. More specifically, since the window system protrudes from the wall of the enclosure, in this particular example, the first arm of the L-shaped bracket may be adapted to withstand the impact of the projectile incoming in a direction perpendicular to the first arm, thereby protecting the stud, and consequently, the engagement of the window system with the wall of the enclosure.

It should also be noted that under such an arrangement, the risk of the window system becoming disengaged from the wall of the enclosure due to mechanical damage of the studs (e.g. due to the impact of an incoming projectile) is considerably reduced.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
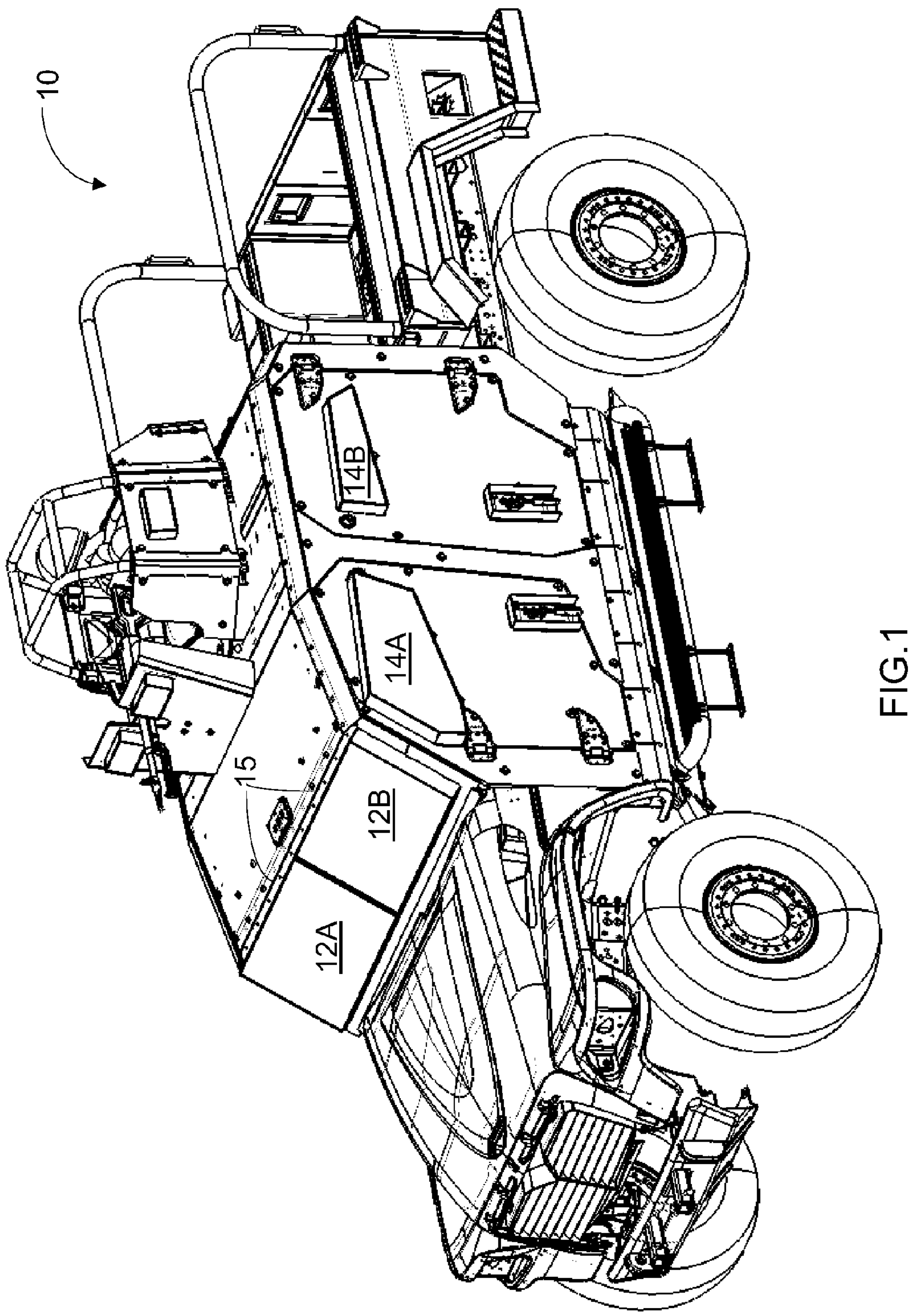
FIG. 1 is a view of a vehicle fitted with reinforced windows in accordance with the present invention.

Attention is first directed to FIG. 1 of the drawings illustrating a vehicle generally designated 10 and comprising two front window shields 12A and 12B being substantially similar to one another, and side windows of which 14A and 14B are mounted in the front and rear doors, respectively.

Figure 2A:
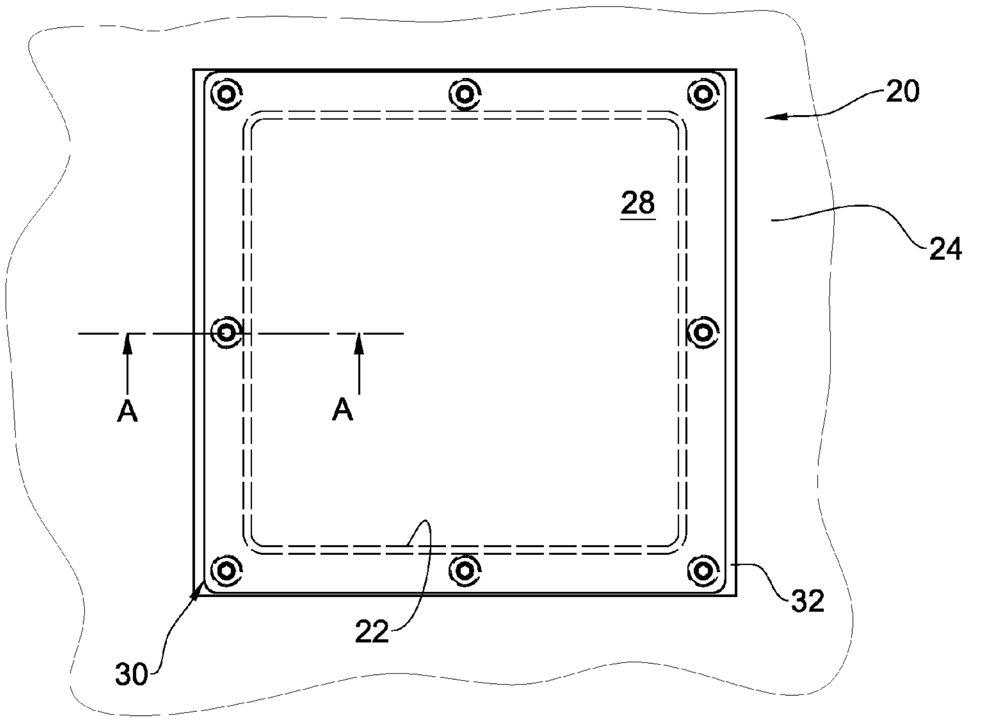
FIG. 2A is a front elevation of a window in accordance with the present invention.
Figure 2B:
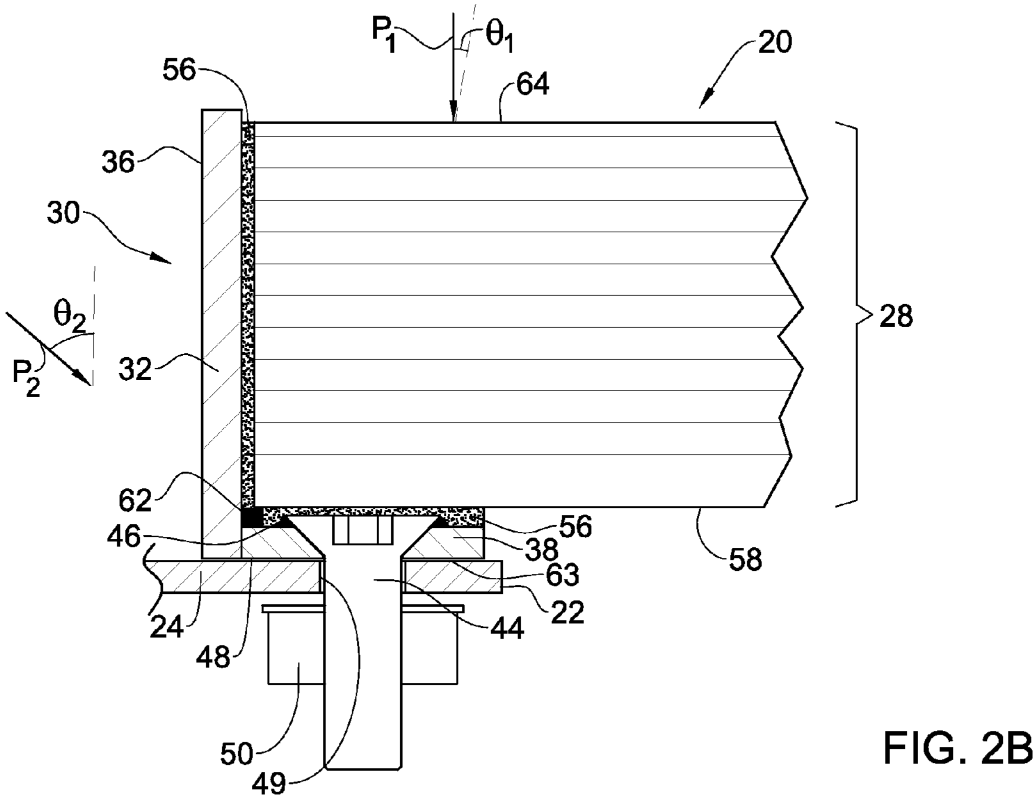
FIG. 2B is a section taken along the line II-II in FIG. 2A.

For better understanding the invention and to see how it is carried out in practice, further attention is now directed to FIGS. 2A and 2B directed to a vehicle’s window, e.g. to one of windows 12 or 14. The window system illustrated in FIGS. 2A and 2B is generally designated 20 and is externally mounted over an opening 22 formed in a vehicle wall 24. In a particular example, the window system 20 comprises a reinforced window pane 28 generally following the shape of the opening however being slightly larger.

The reinforced window pane 28 is a multilayered window which, in the present example, is composed of side layers and having a total thickness of about 115 mm of layers imparting the window ballistic properties so as to withstand impact of a projectile such as a bullet, shrapnel, blast, etc. as known in the art.

The window pane 28 is fixedly received, as will be discussed hereinafter, within a frame 30 comprising two parallely extending brackets 32. It can best be seen in FIG. 2B, each bracket 32 has an L-like shape having a first arm 36 extending perpendicular with the vehicle's walls 24 and a second arm 38 extending substantially parallel to the wall 24 and to the surface of the window pane 28 however behind it and in front of the wall 24. However, it should be noted that the frame 30 may comprise more than two brackets, e.g. three, four or more (depending on the geometric shape of the window pane 28 and of the opening 22), for example, a rectangular frame comprising four brackets 32.

It is noted that when the window 20 is mounted onto the vehicle wall 24, the entire window 20 protrudes from the vehicle wall 24, i.e. such that the first arm 36 of the frame 30 is exposed, at least from a side thereof, to the impact of an incoming projectile.

The first arm 36 of bracket 32 is made of ballistic steel (high hardness steel), thereby providing protection against an impacting projectile incoming from the side of the window 20. The second arm 38 may be made of mild steel or any other non-hard steel, for purposes of reducing costs. It is noted that since the second arm 38 is flush with the wall 24 of the vehicle, it is not required to be with particular ballistic characteristics, since most of the protection is provided by the wall 24 of the vehicle 10 itself.

The second arm 38 is fitted with one or more studs 44 fixedly secured to e.g. welding 46 and projecting through a rear wall 48 of the second arm 38. Stud 44 is threaded for coupling by a nut 50 once the frame 30 is secured over the opening 22 as will be discussed hereinafter.

The window pane 28 is fixedly sealed within the frame by an appropriate adhesive layer 56 applied between the first arm 36 and the side edges of the window pane 28 and between the second arm 38 and the respective portion at the rear surface 58 of the window pane 28. According to a particular design, the window pane 28 is applied into the frame by pressure, in addition to the adhesive agent, that being the case where a closed frame is provided, e.g. in the embodiment of FIG. 4.

It is further noticed that a spacer 62 having a rectangle cross-section is provided at the inner corner of bracket 32 for supporting window pane 28 upon assembly and to prevent damage to the respective corners of the window pane.

Once the window frame 30 is assembled and window pane 28 is fixedly articulated thereto, the window system is applied over the opening 22 such that studs 44 are introduced into corresponding openings 49 formed in wall 24 for fastening by nuts wherein studs 44 are prevented from rotation by their welding at 46 to the second arm 38. As can be noticed in FIG. 2B, the external surface 54 of the window pane 28 is free from any obstacles and is flush, in the present example, with the end of the first arm 36 thereby preventing any obstacles e.g. from a wiper of the vehicle. Furthermore, it is noticed that the effective disturbance area of the L-shaped bracket is minimal so as to reduce dead space caused once applied over a front shield of a vehicle.

It is also noticed that a sealing agent 63 is applied between the second arm 38 and the wall 24 by the system becomes water-tight. Such sealing agents may be, for example, Sikaflex®.

It is also important to note that under the above described arrangements, the studs 44 securely holding the window 20 in place are protected on all sides from possible incoming projectiles. In particular, it is observed that the portion of the stud 44 externally protruding from the vehicle wall 24 (i.e. the head of the stud) is protected from the front by the reinforced window pane 28 and from the side by the first arm 36 of the L-shaped bracket 32.

Thus, a projectile incoming in a direction generally perpendicular to the vehicle wall 24, as denoted by arrow $P_1$ (angle $\theta_1$, also referred to as 'a direct hit'), is likely to impact the reinforced window pane 28 and prevented thereby to penetrate the vehicle 10 or damage the studs 44. Alternatively, a projectile incoming in a direction considerably angled to the vehicle wall 24, as denoted by arrow $P_2$ (angle $\theta_2$ also referred to as 'a side hit'), is likely to impact the first arm 36 of the L-shaped bracket 32 and prevented thereby from inflicting damage the studs 44.

The above design provides the advantage of the window 20 being both externally mounted to the vehicle wall 24 (and protruding therefrom) while having all the elements securing the window to the vehicle wall 24 (in this particular example studs 44) being completely protected from incoming projectiles.

Figure 3A:
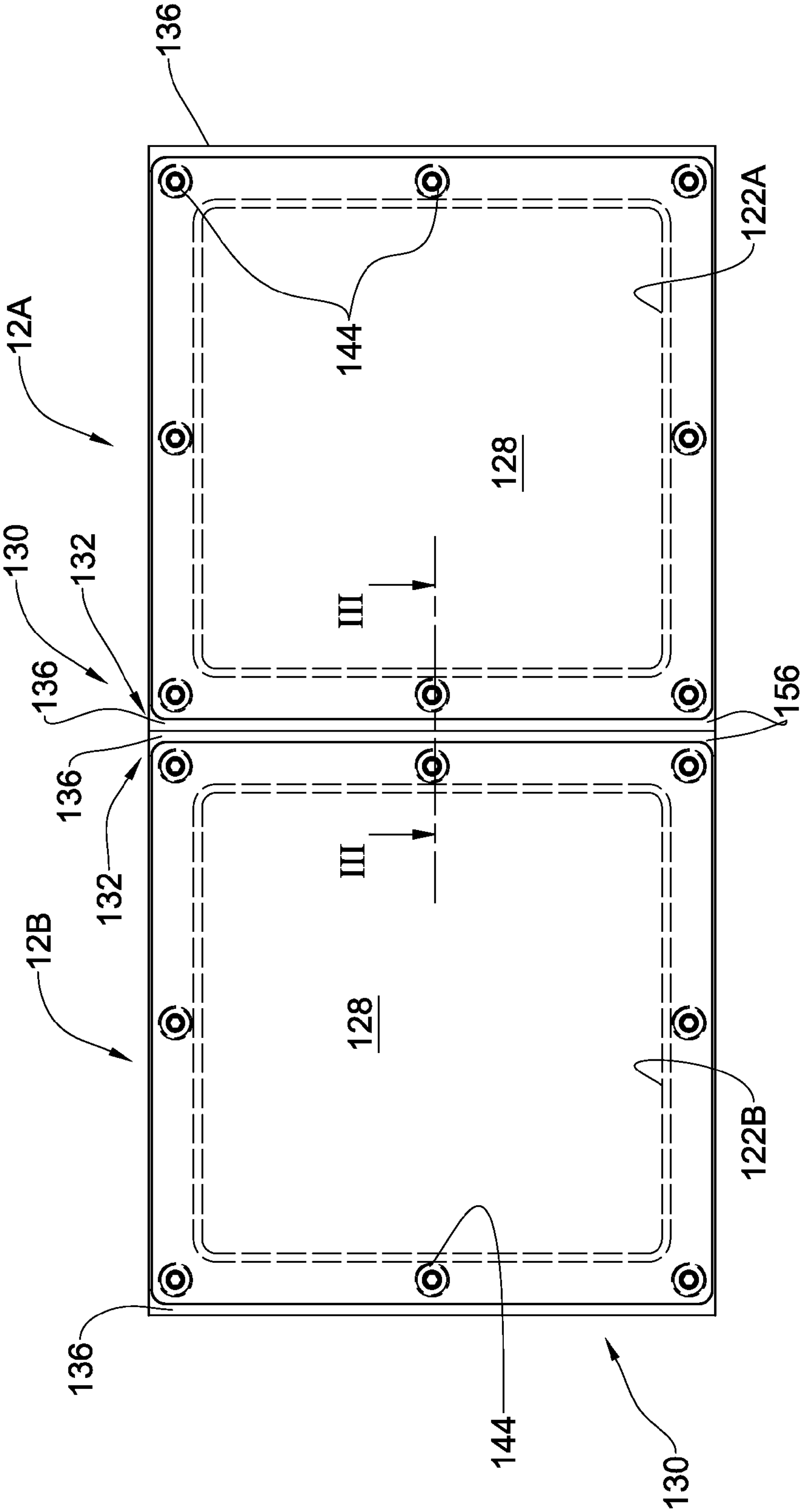
FIG. 3A is a front elevation of two adjoined windows constituting the vehicle’s front window.
Figure 3B:
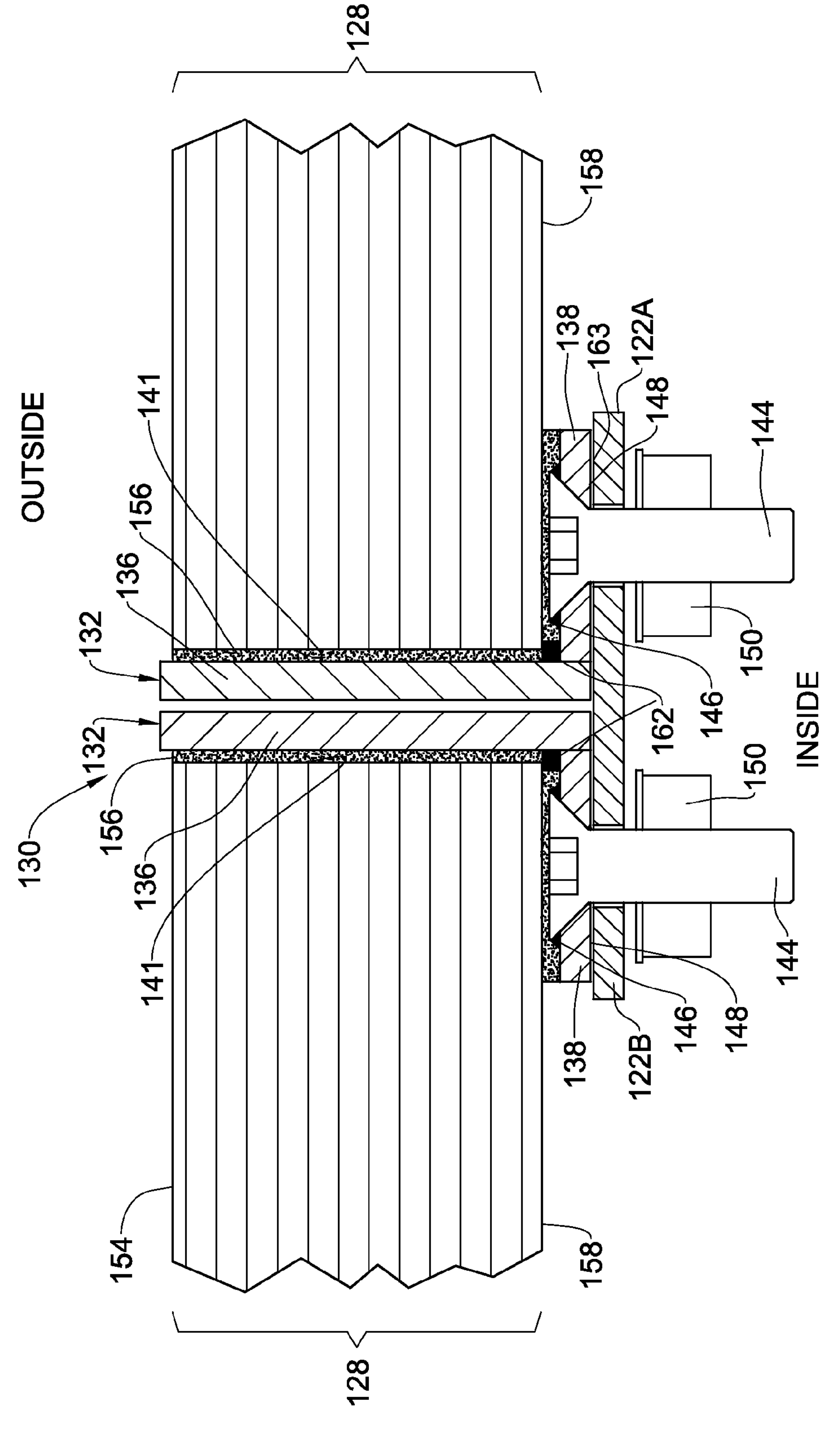
FIG. 3B is a section taken along line III-III in FIG. 3A.

Turning now to FIGS. 3A and 3B there is illustrated a vehicle's front window assembly 15 composed of two adjoining window systems 12A and 12B. Each of the window systems 12A and 12B is substantially similar to the arrangement disclosed in connection with the disclosure of FIGS. 2A and 2B and thus like reference numerals are used, however shifted by 100.

Each window assembly 12A and 12B comprises a reinforced window pane 128 is fixedly received within a frame 130 comprising two parallely extending brackets 132. It can best be seen in FIG. 3B, each bracket 132 has an L-like shape having a first arm 136 extending perpendicular with the vehicle's walls 124 and a second arm 138 extending substantially parallel to the wall 124 and to the surface of the window pane 128, however behind it and in front of the wall 124.

The first arm 136 of each bracket 132 is made of ballistic steel (high hardness steel) whilst the second arms 138 may be made of mild steel or any other non-hard steel, for purposes of reducing costs.

As can best be seen in FIG. 3B, the second arm 138 is fitted with one or more studs 144 fixedly secured to e.g. welding 146 and projecting through a rear wall 148 of the second arm 138. Stud 144 is threaded for coupling by a nut 150 once the frame 130 is secured over the respective openings 122A and 122B as will be discussed hereinafter.

The window panes 128 are fixedly sealed within their respective frame by an appropriate adhesive layer 156 applied between the first arm 136 and the side edges 141 of the window pane 128, and between the second arm 138 and the respective portion at the rear surface 158 of the window pane 128.

It is further noticed that a spacer 162 having a rectangle cross-section is provided at the inner corner of each bracket 132 for supporting window panes 128 upon assembly and to prevent damage to the respective corners of the window pane.

Once each of the window systems 12A and 12B are assembled, i.e. the window frames 130 are assembled and window panes 128 are fixedly articulated thereto, the window systems are applied over the respective openings 122A and 122B such that studs 144 are introduced into corresponding openings 149 formed in wall 124 for fastening by nuts 150 wherein studs 144 are prevented from rotation by their welding at 146 to the second arm 138.

As can be noticed in FIG. 3B, the external surfaces 154 of the window panes 128 are free from any obstacles and is flush with the end of the first arms 136. Furthermore, it is noticed that the effective disturbance area of the two adjoining L-shaped brackets is minimal, as they are disposed in a back-t-back relation, so as to reduce dead space caused once applied over a front shield of a vehicle.

It is also noticed that a sealing agent 163 is applied between the second arms 138 and the wall 124 by the system becomes water-tight.

With reference to FIGS. 3A and 3B, it is noted that since those first arms 136 of the windows 120 facing each other at the zone in which the windows are adjoined are protected from a 'side hit' of a projectile, the studs 44 located at this zone are more protected than other studs 44 at a location remote from this zone.

Figure 3C:
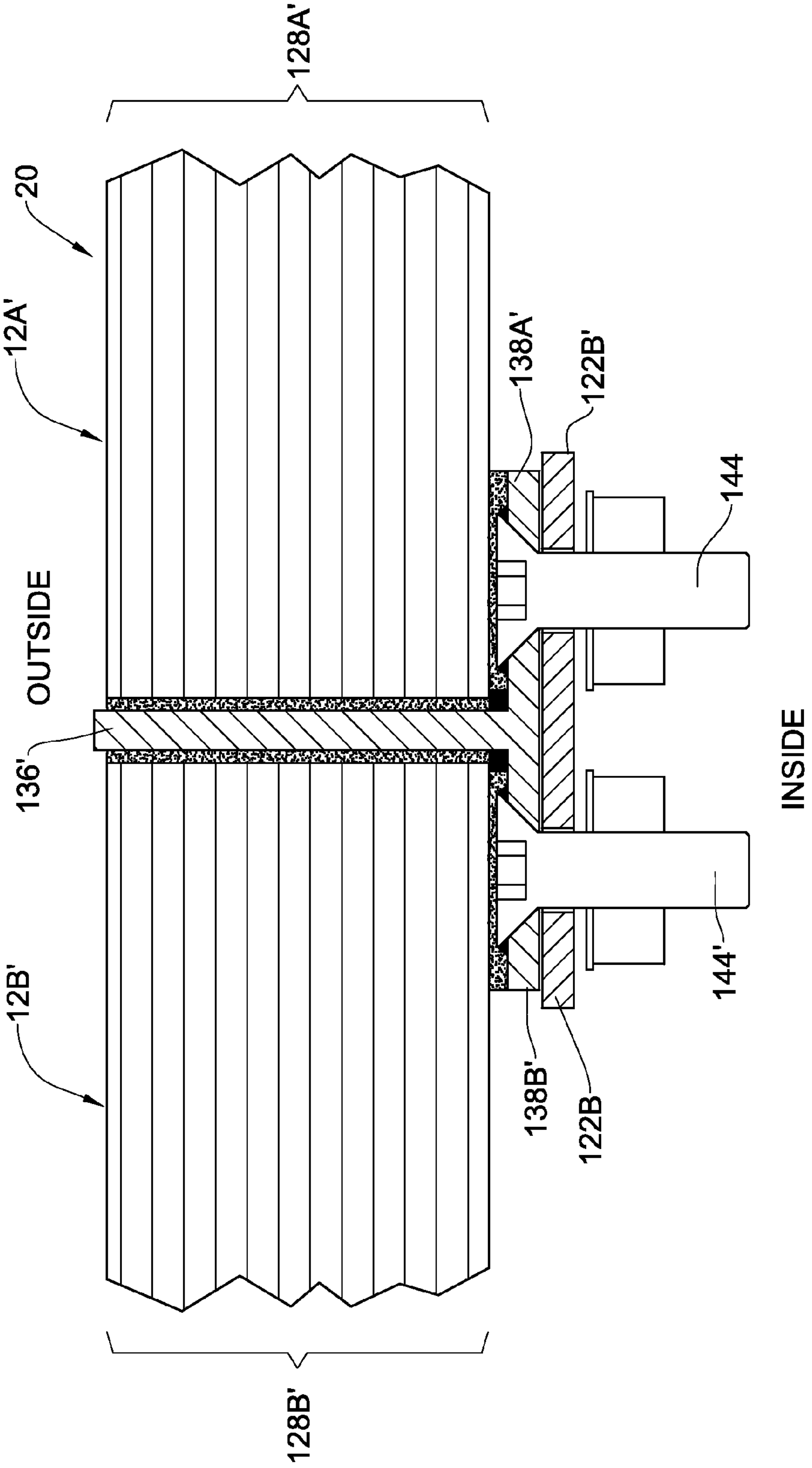
FIG. 3C is an alternative configuration for supporting two adjoined windows in accordance with the present invention.

The embodiment of FIG. 3C is based on the concept disclosed in FIG. 3B i.e. a window assembly composed of two window systems 12A' and 12B', wherein the window panes 128A' and 128B' are fixedly supported within their respective frames as discussed hereinabove, however, the frames 130' has an inverted T-like cross-section with a common first arm 136' and two branching second arms 138A' and 138B' fixed over the openings 122A' and 122B' respectively, by studs 144.

Like in connection with the previous embodiment disclosed in connection with FIGS. 2A and 2B, each window system comprises a frame composed of two parallely extending brackets. However, it is appreciated that each window system may comprise 3 or 4 brackets as exemplified in connection with the embodiments of FIGS. 4 and 5.

Figure 4:
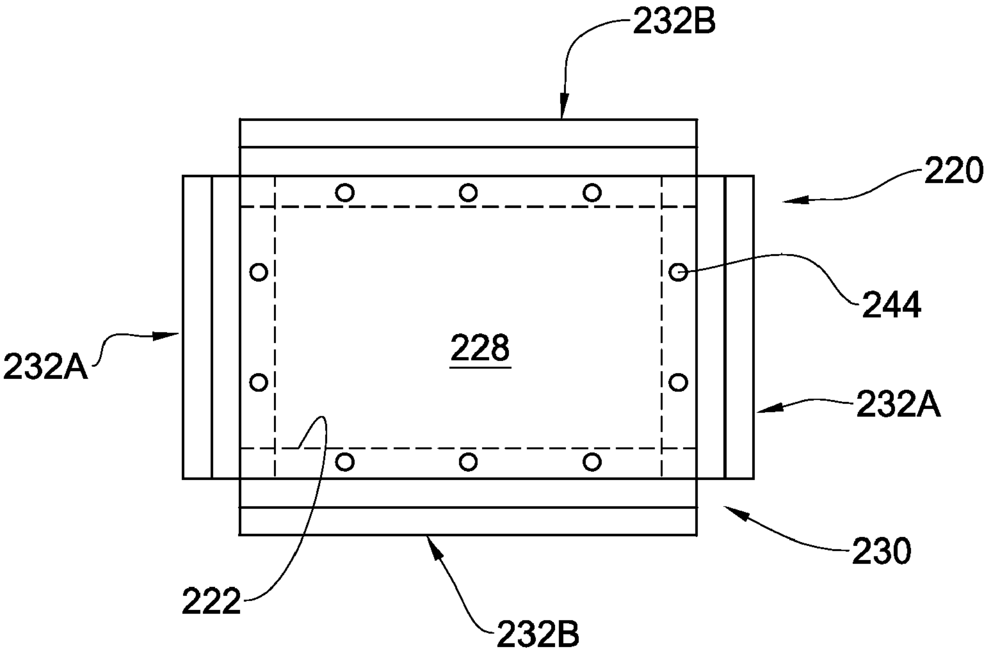
FIG. 4 is a front elevation of a window in accordance with the present invention with a reinforced support frame.

FIG. 4 illustrates a rectangular window system according to the present invention being similar to the previously discussed window systems, wherein like elements are designated with like reference numbers as in FIG. 2A, however shifted by 200.

The window system generally designated 220 is substantially rectangle and is suitable for fitting over a corresponding opening. The window system 220 comprises a window pane 228 received within a rectangle frame 230 composed of four brackets, namely a first pair of opposing brackets 132A and a second pair of opposing brackets 232B. Each of the brackets 132A and 132B is substantially similar to the brackets disclosed herein before, and fixedly support the reinforced window pane in the same manner as discussed herein above in connection with previous embodiments.

The arrangement of FIG. 4 may be used for a single window, or for an array of windows, e.g. as disclosed in connection with the embodiment of FIG. 3A.

Figure 5:
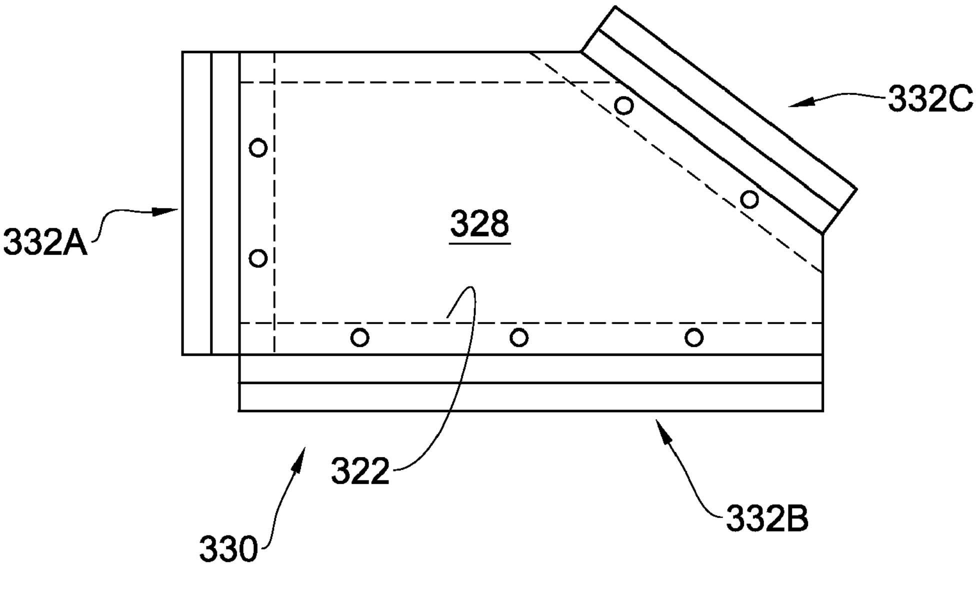
FIG. 5 is a front elevation of a non-rectangle window in accordance with the present invention.

Turning now to FIG. 5 there is illustrated a window system according to yet another example of the present invention being similar to the previously discussed window systems, wherein like elements are designated with like reference numbers as in FIG. 2A, however shifted by 300.

The window system generally designated 320 is pentagon-shaped and is suitable for fitting over a corresponding opening, e.g. of a rear window 16 of the vehicle 10 illustrated in FIG. 1

The window system 320 comprises a window pane 328 received within a frame 330 composed of three brackets, namely brackets 332A, 332B and 332C, wherein each of said brackets is substantially similar to the brackets disclosed herein before, and together fixedly support the reinforced window pane 328 in the same manner as discussed herein above in connection with previous embodiments. Whilst the window system 330 comprises only three brackets, it is appreciated that four or five brackets may be provided.

Figure 6:
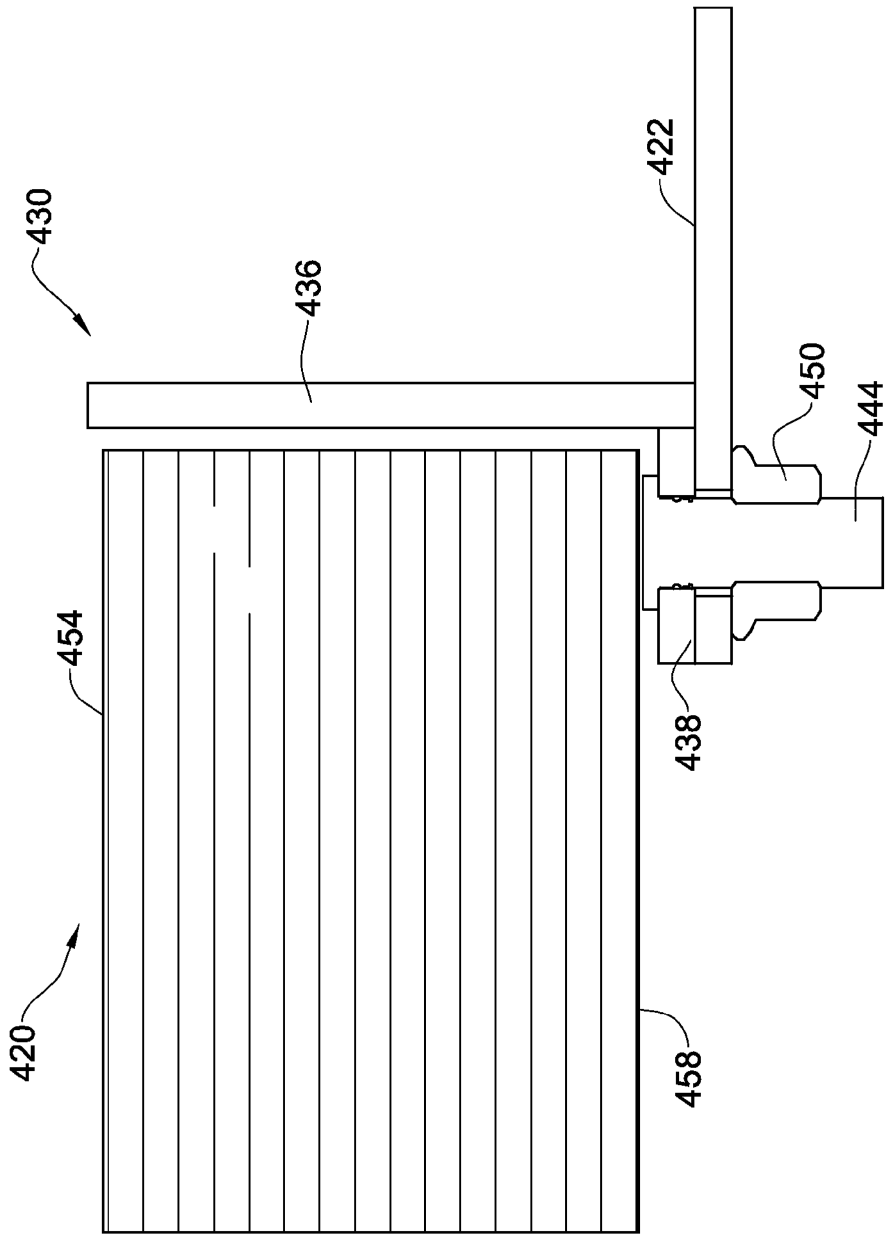
FIG. 6 is a schematic cross-section view of another embodiment of the window system shown in FIG. 2B.

FIG. 6 illustrates a window system according to the present invention being similar to the previously discussed window systems, wherein like elements are designated with like reference numbers as in FIG. 2A, however shifted by 400.

The difference between the window system 420 and the previously disclosed window systems lies in the fact that the studs 444 are in the form of pins (as opposed to previously described screws), and are secured from within the vehicle by fasteners 450 which are pressure mounted onto the pins.

Those skilled in the art to which this invention pertains will readily appreciate that numerous changes, variations, and modifications can be made without departing from the scope of the invention, Mutatis Mutandis.

The invention claimed is:

1. A window system for externally mounting to a wall of an enclosure, the system comprising:

a reinforced window pane fixedly received within a frame comprising at least two brackets for securely mounting to an external wall surface of the wall delimiting an opening; and wherein each of the at least two brackets has a generally L-shape section including a first arm made from a ballistic material for protecting against an incoming projectile and securely attached to a side edge of the window pane and a second arm that extends substantially parallel to and behind the window pane, said second arm is fixedly fitted with at least one stud for projecting through and securing within a stud opening formed in the wall delimiting said opening.

2. A window system according to claim 1, wherein the reinforced window pane is a multi-layered pane.

3. A window system according to claim 1, wherein the thickness of the window pane is at least 100 mm.

4. A window system according to claim 1, wherein the window pane is a ballistic window.

5. A window system according to claim 1, further comprising a sealant material that extends between the second arm of each of the at least two brackets and exterior wall surface delimiting the opening in the wall.

6. A window system according to claim 1, wherein the stud is one of the following:

A screw, threaded for fastening by a nut; and

A pin adapted for receiving a pressure-fitted member.

7. A window system according to claim 1, wherein the ballistic material of the first arm is made of high-hardness steel.

8. A window system according to claim 1, further comprising deformable spacers each of which is applied at a corresponding inner corner of one of the at least two brackets, with corners of the window pane bearing against corresponding ones of the deformable spacers.

9. A window system according to claim 1, wherein the window pane is securely attached to each of the first arms of the at least two brackets by adhering.

10. A window system according to claim 1, further comprising an adhesive material applied between the second arm of each of the at least two brackets and a rear surface of the window pane.

11. A window system according to claim 1, wherein the frame comprises two opposite, substantially parallel brackets.

12. A window system according to claim 1, comprising two or more adjoining windows, wherein the first arms of neighboring L-shaped brackets extend in a back-to-back relation to define a generally T-like composed bracket.

13. A window system according to claim 12, wherein two neighboring window panes share a common bracket having a T-like section.

14. A window system according to claim 1, wherein the at least one stud is welded to the second arm.

15. A window system according to claim 1, wherein one of the stud and the second arm of the bracket is fitted with one or more projections and the other of said stud and the second arm of the bracket is formed with corresponding one or more notches whereby the stud is rotatably secured to the second arm of the bracket.

16. A method for externally mounting a window over an opening in a wall of an enclosure, the method comprising the following steps:

(a) forming several through going bores at an external wall surface delimiting said opening;

(b) obtaining a frame comprising at least two brackets, each bracket having a generally L-shape section with a first arm being made of a ballistic material for protecting against an incoming projectile and a second arm, said second arm is fixedly fitted with one or more studs projecting from a rear face of the second arm and corresponding with the location of said bores;

(c) fixedly fitting a reinforced window pane within the frame such that side edges of the window pane are securely attached to the first arm of the bracket and wherein the second arm extends substantially parallel and behind the window pane;

(d) mounting the assembled frame obtained at step (c) over said opening and fixing it by securing the studs at an inside surface of the wall.

17. A method according to claim 16, wherein securing the studs is performed by one of the following:

The stud is in the form of a screw and is adapted for fastening by a nut; and

The stud is in the form of a pin and is adapted for receiving thereon a pressure-fitted member.

18. A method according to claim 16, further comprising a deformable spacers each of which is applied at a corresponding inner corner of one of the at least two brackets, with corners of the window pane bearing against corresponding ones of the deformable spacers.

19. A method according to claim 16, wherein the window pane is securely attached to the first arm of the bracket by an adhesive material applied between the second arm of the bracket and a rear surface of the window pane.

20. A method according to claim 16, wherein the stud is welded to the second arm of the bracket.

* * * * *